(12) United States Patent
Newell

(10) Patent No.: US 7,421,794 B2
(45) Date of Patent: Sep. 9, 2008

(54) DEVICE AND METHOD FOR MEASURING AN ANIMAL'S MOUTH

(75) Inventor: Danny Leon Newell, Saranac, MI (US)

(73) Assignee: Newell Products, LLC, Saranac, MI (US)

( * ) Notice: Subject to any disclaimer, the term of this patent is extended or adjusted under 35 U.S.C. 154(b) by 0 days.

(21) Appl. No.: 11/539,451

(22) Filed: Oct. 6, 2006

(65) Prior Publication Data

US 2007/0107243 A1    May 17, 2007

Related U.S. Application Data

(60) Provisional application No. 60/747,133, filed on May 12, 2006.

(51) Int. Cl.
    *G01B 3/04*     (2006.01)
    *A61B 5/107*     (2006.01)

(52) U.S. Cl. .............................. 33/511; 33/783; 33/811

(58) Field of Classification Search .................. 33/195, 33/501.08, 501.4, 501.5, 511, 512, 513, 514, 33/783, 787, 792, 794, 795, 796, 797, 798, 33/799, 801, 806, 810, 811, 812; 600/590; D10/70, 71
See application file for complete search history.

(56) References Cited

U.S. PATENT DOCUMENTS

| | | | | |
|---|---|---|---|---|
| 1,393,266 A | * | 10/1921 | Cousins | ....................... 33/796 |
| 2,332,667 A | * | 10/1943 | Reed et al. | ..................... 33/514 |
| 4,411,622 A | * | 10/1983 | Hansen | ......................... 433/73 |
| 4,834,112 A | * | 5/1989 | Machek et al. | ............... 600/587 |
| 5,158,096 A | * | 10/1992 | Clark et al. | .................. 600/590 |
| D363,246 S | * | 10/1995 | Angles | ....................... D10/101 |
| 5,697,163 A | | 12/1997 | Ulrich | |
| 5,873,175 A | * | 2/1999 | Johnston | ....................... 33/809 |
| 5,918,377 A | | 7/1999 | Ulrich | |
| 6,979,299 B2 | * | 12/2005 | Peabody et al. | .............. 600/587 |
| 2001/0083614 | * | 5/2004 | Raskin et al. | .................. 33/286 |
| 2005/0039341 A1 | * | 2/2005 | Hickey | ......................... 33/365 |

FOREIGN PATENT DOCUMENTS

GB      2392498 A    *    3/2004

\* cited by examiner

*Primary Examiner*—R. A. Smith
(74) *Attorney, Agent, or Firm*—Price, Heneveld, Cooper, DeWitt & Litton LLP

(57) ABSTRACT

A device and method for measuring the mouth of an animal are provided. The device includes a gripping handle and rod coupled to a first endpiece. The rod is threaded along at least part of its length. The device includes a second endpiece that includes a threaded hole. The second endpiece is rotatably threaded onto a threaded portion of the rod. The threads of the rod and threaded hole cause the second endpiece to move laterally along the threaded length of the rod when the second endpiece is rotated about the rod. By placing the rod adjacent to the mouth of an animal and rotating the second endpiece until the first and second endpieces are located adjacent to boundaries of dimension of the animal's mouth that is to be measured, the desired dimension of the animal's mouth can be determined from the distance between the first and second endpieces.

20 Claims, 2 Drawing Sheets

DEVICE AND METHOD FOR MEASURING AN ANIMAL'S MOUTH

CROSS-REFERENCE TO RELATED APPLICATION

This application claims the benefit under 35 U.S.C. § 119 (e) of U.S. Provisional Application No. 60/747,133, filed on May 12, 2006, the entire disclosure of which is hereby incorporated herein by reference.

BACKGROUND OF THE INVENTION

The present invention generally relates to measurement devices and methods, and, more particularly, to devices and methods for measuring the mouths of animals.

The ability to measure the mouths of animals can be important for those raising animals, caring for animals, managing animals, and using the animals to provide services. The ability to measure an animal's mouth is especially important for those attempting to control animals by means of devices placed in or adjacent to the animal's mouth. The use of a bit in the mouth of a horse is one example of the use of a device placed in an animal's mouth in order to control the animal. By placing a bit in a horse's mouth and attaching devices, such as reins, to the bit, an individual is able to control the horse by pulling on the reins. The reins can be used to cause the horse to stop, turn, or perform various other movements. In order to effectively control a horse by using a bit, it is important that the bit be sized appropriately to the horse's mouth. An improperly sized bit is not only uncomfortable for the horse, but can also lead to an inability to effectively communicate commands to the horse through the reins and bit.

Various methods have been employed to measure a horse's mouth, such that an appropriately sized bit can be provided. One example of a method used to measure a horse's mouth is to place a string in the horse's mouth, pull the string taut across the horse's mouth, observe the points on the string that represent the width of the horse's mouth, remove the string, and measure the width. Another method, disclosed in U.S. Pat. No. 5,697,163, involves the use of a graduated crossbar having first and second stops. At least one stop can be slid along the crossbar such that when the bar is placed in the horse's mouth, one stop is positioned at one side of the horse's mouth, while the other stop is slid along the crossbar until it reaches the other side of the horse's mouth. In this manner, the width of the horse's mouth can be measured by determining the distance between the first and second stops.

Trial and error can also be used to measure the width of a horse's mouth. This involves selecting a bit of a certain length, positioning the bit in the horse's mouth, and determining if it is of the appropriate size. If the bit does not fit properly, a bit of another length is selected and placed in the horse's mouth. This process continues until a bit of an appropriate length has been identified.

While these methods and devices do allow the width of a horse's mouth to be determined, the process can be time-consuming (trial and error) and unwieldy, and can often be made more difficult by the motion of the horse's head, and its dislike for, and resistance to, having a measuring device placed in or near its mouth. The inventor has recognized a need to provide for a measurement device that is less objectionable to a horse when placed in or near the horse's mouth, and that can more simply and securely determine and maintain a measured distance in the presence of an agitated and/or reluctant animal without requiring additional hardware or user invention.

SUMMARY OF THE INVENTION

According to one embodiment of the present invention, a device for measuring the mouth of an animal is provided. The device includes a handle that can be gripped by a human, and that is connected to one surface of a first endpiece. The first endpiece is also coupled to one end of a rod that is at least partially threaded. A second endpiece having a threaded hole that is configured to rotatably thread on the threaded portion of the rod moves laterally along the threaded portion of the rod when it is rotated. A dimension of the mouth of an animal adjacent to the rod may be measured by rotating the second endpiece along the rod until the position of the first and second endpieces is indicative of a dimension of the adjacent mouth.

According to another embodiment of the present invention, a method for measuring a dimension of the mouth of an animal using a threaded rod having a first endpiece attached to one end of a rod and to a handle, and having a second threaded endpiece threaded onto the rod, is provided. The method includes the steps of positioning the threaded rod adjacent to an animal's mouth and rotating the second threaded endpiece on the threaded rod, causing it travel laterally along the length of the threaded rod. The method also includes the steps of stopping the rotation of the second threaded endpiece when first and second endpieces are adjacent features of an animal's mouth to be measured, and determining the desired dimension of the animal's mouth by determining the distance between the first and second endpieces.

According to a third embodiment of the present invention, a device for measuring the mouth of an animal is provided. The device includes a handle configured to be gripped by a human and connected to a first endpiece. A threaded rod comprising a thermoplastic elastomer (TPE) has one end coupled to the first endpiece. A second endpiece having a threaded hole configured to rotatably thread on a threaded portion of the rod is configured to move laterally along the length of a threaded area of the rod when rotated about an axis formed along the length of the rod. A dimension of the mouth of an animal adjacent to the rod may be measured by rotating the second endpiece along the rod until the position of the first and second endpieces is indicative of a desired dimension of the adjacent mouth.

These and other features, advantages, and objects of the present invention will be further understood and appreciated by those skilled in the art by reference to the following specification, claims, and appended drawings.

BRIEF DESCRIPTION OF THE DRAWINGS

The foregoing and other objects, aspects, and advantages will be better understood from the following detailed preferred embodiment descriptions with reference to the drawings, in which.

DETAILED DESCRIPTION OF THE PREFERRED EMBODIMENTS

Figure 1:
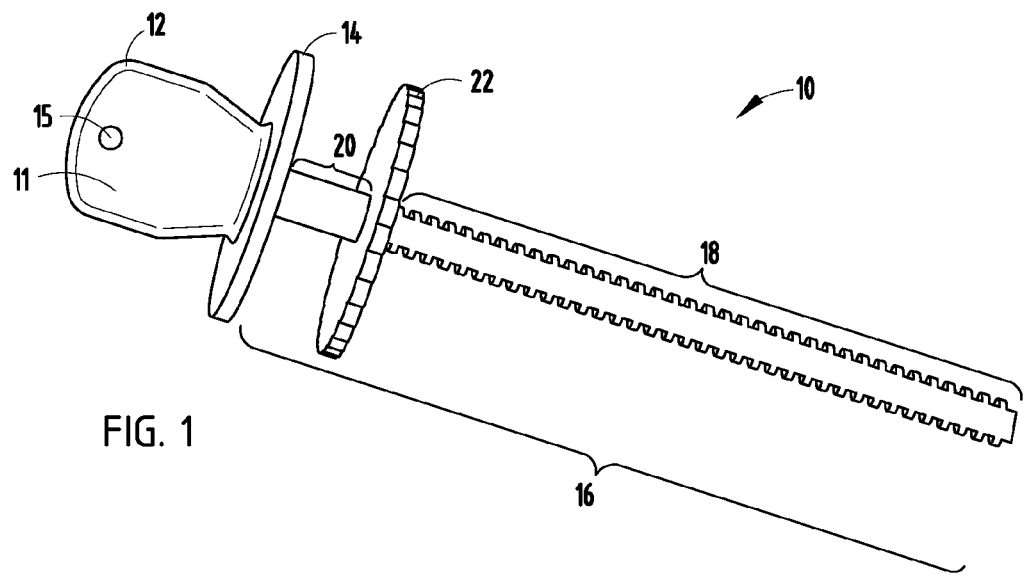
FIG. 1 is a perspective view of a device for measuring an animal's mouth, according to one embodiment of the present invention.
Figure 2:
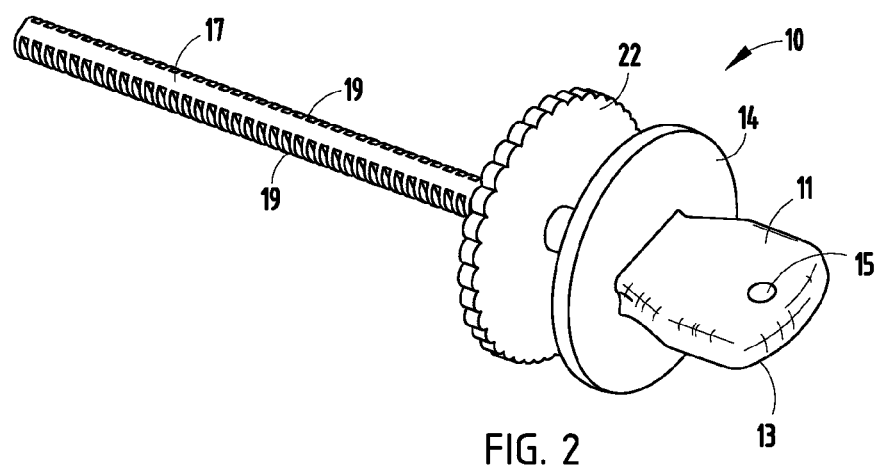
FIG. 2 is a second perspective view of a device for measuring an animal's mouth, according to the embodiment of FIG. 1.
Figure 2A:
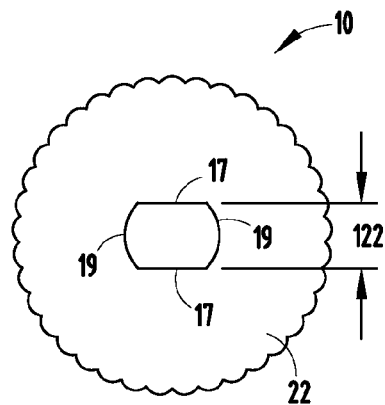
FIGS. 2A and 2B are opposite end views generally illustrating a device for measuring an animal's mouth, according to the embodiment of FIG. 1.
Figure 2B:
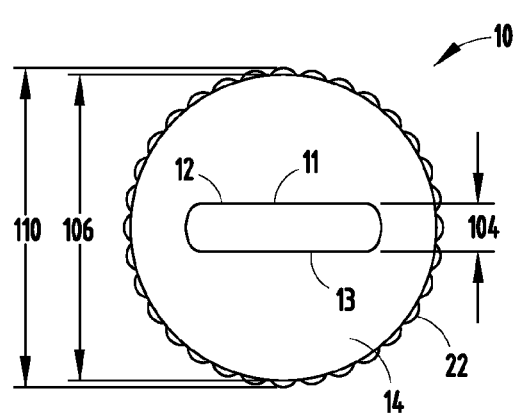
Figure 3:
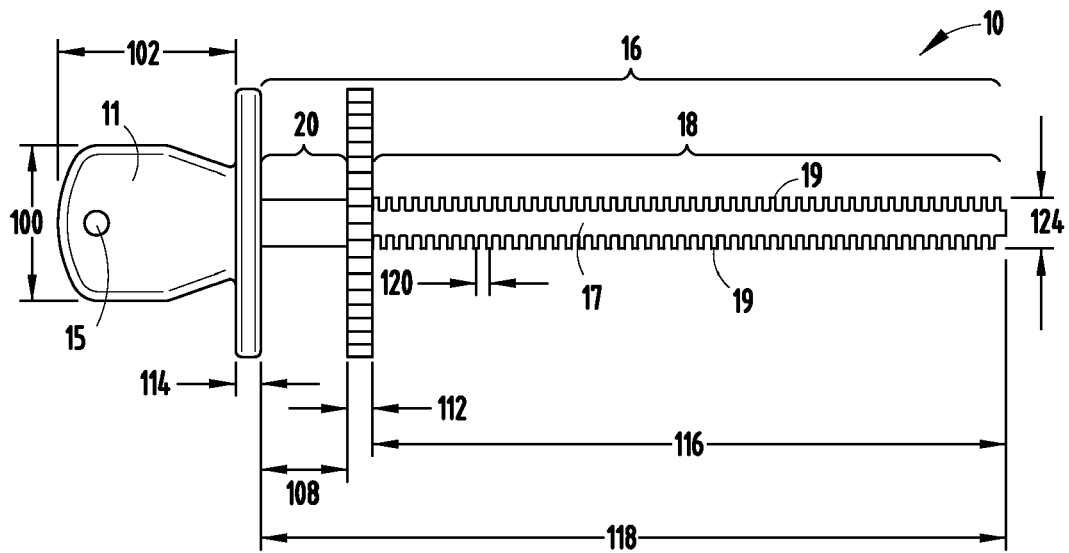
FIG. 3 is a side view of a device for measuring an animal's mouth, according to the embodiment of FIG. 1.

FIGS. 1-3 generally illustrate a measuring device 10 for measuring the mouth of an animal, according to one embodiment of the present invention. Measuring device 10 includes a handle 12 joined to a first endpiece 14. As shown, handle 12 is a generally flat paddle made of a thermoplastic elastomer (TPE), and has upper and lower primary gripping surfaces 11 and 13. Handle 12 has a length 102 of 2 inches and a width 100 of 1.75 inches. Handle 12 is also shown having a thickness 104 of ½ inch. In the present embodiment, handle 12 is also shown having a perforation 15 from upper primary gripping surface 11 through the thickness 104 of handle 12 to lower primary gripping surface 13. Perforation 15 may be used to suspend measuring device 10 from an object, e.g., a string or rope, threaded through the perforation 15. Although handle 12 is shown having a length 102 of 2 inches, a width 100 of 1.75 inches, a thickness 104 of ½ inch, and a general paddle shape, it should be appreciated that, in alternate embodiments, handle 12 could have a different length 102, width 100, thickness 104 and/or shape, provided that the handle is capable of being gripped by a human hand. For example, in one alternate embodiment, handle 12 has a length 102 between approximately 1 inch and 4 inches, a width 100 between approximately 1 inch and 4 inches, and a thickness 104 between approximately ¼ inch and 1 inch.

Handle 12 is shown joined to first endpiece 14. First endpiece 14 is in the shape of a disc having a diameter 106 of 3 inches and a thickness 114 of ¼ inch. As shown, handle 12 is joined to a planar surface of first endpiece 14. Although first endpiece 14 is shown having the shape of a disc with a diameter 106 of 3 inches and a thickness 114 of ¼ inch, it should be appreciated that in alternate embodiments, first endpiece 14 could have a different diameter 106, thickness 114, and/or shape. For example, in one alternate embodiment, first endpiece 14 has a diameter 106 of between 1 inch and 5 inches, and a thickness 114 between ⅛ inch and ½ inch.

First endpiece 14 is joined to a rod 16. As shown, rod 16 includes both threaded areas 18 and unthreaded areas 20. The threaded areas 18 are configured such that when an object having a threaded hole with a diameter and threads similar to those of threaded area 18 is rotated onto the threaded area 18 of rod 16, the threaded object may be moved laterally along the axis of the rod 16 in the threaded area 18 of rod 16 by rotating the object. As shown, rod 16 has a cross-section that includes flat upper and lower surfaces 17 and curved lateral surfaces 19. As shown, the distance 122 between the upper and lower surfaces 17 of rod 16 is 400 thousandths of an inch, while the distance 124 between the curved lateral surfaces 19 on opposite sides of rod 16 is approximately ⅝ inch. In an alternate embodiment, the distance 122 between upper and lower surfaces 17 is between 125 thousandths of an inch and 750 thousandths of an inch, while the distance 124 between curved lateral surfaces 19 on opposite sides of rod 16 is between ¼ inch and 1 inch. In yet another alternate embodiment (not shown), rod 16 has a cross-section that is a circle with a diameter between ¼ inch and ¾ inch. As shown, the threads of rod 16 located on the same side of rod 16 are separated by a distance 120 of approximately 0.08 inches. In still another embodiment, the threads of rod 16 located on the same side of rod 16 are separated by a distance 120 of between approximately 0.05 and 0.15 inches.

As shown, rod 16 has a length 118 of approximately 9 inches. The threaded length 116 of rod 16 is approximately 8.25 inches, while the unthreaded length 108 of rod 16 is approximately 1 inch. In an alternate embodiment, rod 16 has a length 118 of between 7 inches and 12 inches, with the threaded length 116 of rod 16 being between approximately 7 inches and 10 inches. In yet another alternate embodiment, the threaded length 116 of rod 16 is less than 7 inches.

In the present embodiment, handle 12, first endpiece 14, and rod 16 are formed from a thermoplastic elastomer known as Hytrel® thermoplastic polyester elastomer, commercially available from DuPont. In an alternate embodiment, a different thermoplastic elastomer, such as, for example, Santoprene™ TPE, commercially available from Advanced Elastomer Systems, L.P., is used to form handle 12, first endpiece 14, and rod 16. In still another alternate embodiment, flavoring, such as apple flavoring, is added to the material used to form handle 12, first endpiece 14, and rod 16. Although as shown, handle 12, first endpiece 14, and rod 16 are all components of one unitary polymer piece, it should be appreciated that in an alternate embodiment, handle 12, first endpiece 14, and/or rod 16 could be individually manufactured and later joined together. In yet another embodiment, handle 12, first endpiece 14 and rod 16 are made of a material other than a thermoplastic elastomer, such as, for example, plastic, metal, rubber, or wood.

FIGS. 1-3 generally illustrate measuring device 10 also including a second threaded endpiece 22. As shown, second endpiece 22 is a disc having a diameter 110 of 3 inches and a thickness 112 of ¼ inch. It should be appreciated that in alternate embodiments, second endpiece 22 could have a different diameter 110 and a thickness 112. In one alternate embodiment, second endpiece 22 has a diameter 110 of between 1 inch and 5 inches, and a thickness 112 of between ⅛ inch and ½ inch. Second endpiece 22 includes a threaded hole with a diameter and thread spacing configured to allow second endpiece 22 to be threaded onto the threaded portion 18 of rod 16. As shown, the edges of second endpiece 22 are scalloped in order to provide a gripping surface to enable second endpiece 22 to be rotated on the threaded area 18 of rod 16 by means of contact from human digits. As shown, second endpiece 22 is made of a thermoplastic elastomer known as Hytrel® thermoplastic polyester elastomer. In an alternate embodiment, second endpiece 22 is made of a different thermoplastic elastomer, such as, for example, Santoprene™ TPE. In still another alternate embodiment, flavoring, such as apple flavoring, is added to the material used to form second endpiece 22. In still another embodiment, second endpiece 22 is made of a material other than a thermoplastic elastomer, such as, for example, plastic, metal, rubber, or wood. In yet another embodiment, second endpiece 22 may have a shape other than a scalloped shape, such as, for example, a square, circle, or triangle.

As can be seen in FIGS. 1-3, second endpiece 22 can be rotated on threaded area 18 of rod 16 such that second endpiece 22 can be completely removed from rod 16. In operation, second endpiece 22 of measuring device 10 is first rotated such that it is on the threaded area 18 of rod 16 near the end of rod 16 opposite first endpiece 14, or such that second endpiece 22 is completely removed from rod 16. Next, a user grips measuring device 10 by handle 12, placing rod 16 into the mouth of an animal, such as a horse. Rod 16 is positioned such that first endpiece 14 is located just outside the animal's mouth, while rod 16 extends across the animal's mouth and out the other side of the animal's mouth. Second endpiece 22, if not already threaded onto the end of rod 16, is threaded on rod 16. Second endpiece 22 is then rotated, causing second endpiece 22 to move laterally toward first endpiece 14 along the threaded section 18 of rod 16, until it is positioned adjacent to and just outside of the horse's mouth at the side of the horse's mouth opposite first endpiece 14. At this point, measuring device 10 is removed from the animal's mouth by gripping handle 12, and the distance between first endpiece 14 and second endpiece 22 is measured, providing the desired measurement of the animal's mouth.

It should be appreciated that the present invention could be employed to measure the width of other features of an animal's mouth by placing the device adjacent to, rather than in, the horse's mouth, placing first endpiece 14 adjacent one boundary of the feature, rotating second endpiece 22 until it is adjacent another boundary of the feature, and measuring the distance between first endpiece 14 and second endpiece 22. It should also be appreciated that the present invention could be employed to measure the width of animal features other than mouths.

In another embodiment of the present invention, units of distance measurement are visibly located on the surface of rod 16 such that the distance between first endpiece 14 and second endpiece 22 can be directly read by viewing the surface of rod 16. In one embodiment, the units of distance measurement include both English and metric units. It should be appreciated that, because of the threaded nature of second endpiece 22, second endpiece 22 retains its position, even after a user has removed his hand from rotating second endpiece 22. It should also be appreciated that additional clips or brackets are not required to maintain second endpiece 22 in position, as the threaded nature of rod 16 and second endpiece 22 act to hold second endpiece 22 into position, facilitating the measurement process, and reducing the possibility of accidental movement of endpiece 22 during the measurement process.

Figure 4:
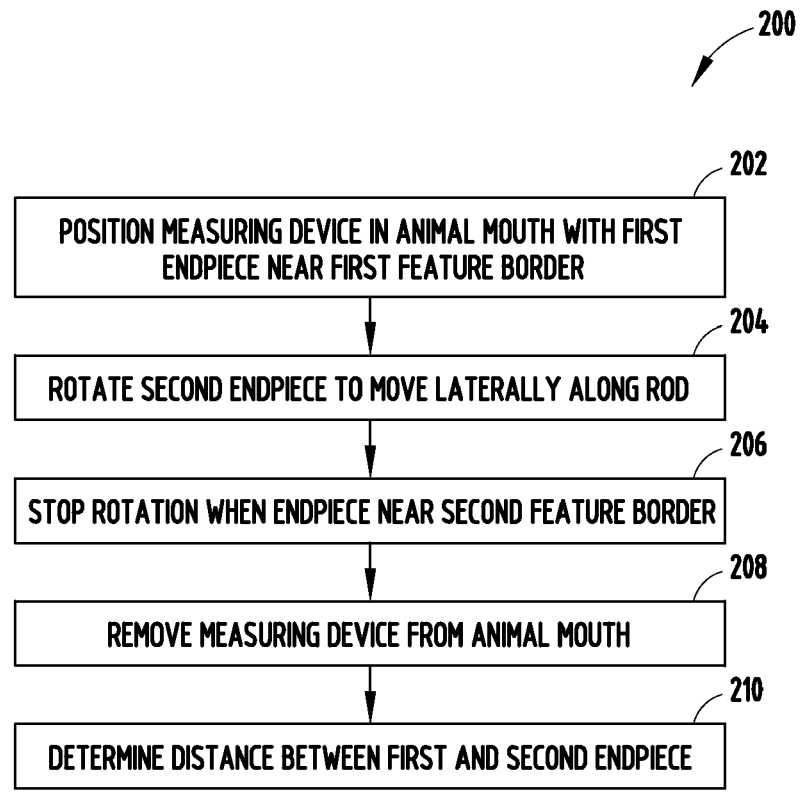
FIG. 4 is a flow diagram generally illustrating a method for measuring an animal's mouth, according to one embodiment of the present invention.

Referring to FIG. 4, a method 200 for measuring an animal's mouth is provided, according to another embodiment of the present invention. In a first step 202 of the method, a measuring device having a threaded rod, a first endpiece attached to the end of the threaded rod, and a handle attached to the first endpiece is positioned in a horse's mouth. The measuring device is positioned such that the first endpiece is located adjacent to one side of the horse's mouth, and such that the threaded rod proceeds from the first endpiece through the horse's mouth and out a side of the horse's mouth opposite first endpiece 14.

In a second step 204 of the method, a threaded second endpiece is rotated, such that it moves laterally along the axis of the rod on a threaded section of the rod toward the first endpiece. In a third step 206 of the method, the rotation of the second endpiece is stopped when the second endpiece is adjacent to the side of the animal's mouth that is opposite the side of the animal's mouth adjacent to the first endpiece. In a fourth step 208 of the method, the measuring device is removed from the animal's mouth. In a final step 210 of the method, the distance between the first and second endpieces is measured, providing the desired measurement of the animal's mouth.

In an alternative method, the measuring device is positioned outside the horse's mouth, but such that it is adjacent a feature on the horse's mouth that is to be measured. The device is positioned such that the first endpiece is located adjacent a boundary of the feature to be measured. Next, the second endpiece is rotated such that it moves laterally along the threaded section of the rod until it is adjacent a second boundary of the feature to be measured. The device is then removed, and the distance between the two endpieces is measured, providing the desired measurement of the feature.

It should be appreciated that the device and methods described above can be employed to measure the mouths of animals other than horses, such as, for example, mules, donkeys, miniature horses, cattle, or other animals whose mouths can contain, or be placed adjacent to, the measuring device. It should also be appreciated that the size, including the diameter, of first endpiece 14 and second endpiece 22 need not be the same.

By providing for a measurement device that includes a threaded rod and a threaded second endpiece, it is possible to measure the mouth of an animal without using additional clamps or hardware to secure the second endpiece in the desired location. In addition, by providing a device for measuring an animal's mouth that is made of a flavored polymer, uneasiness and agitation in the animal whose mouth is being measured can be avoided, resulting in an easier and more reliable measurement of the animal's mouth.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

The invention claimed is:

1. A device for measuring the mouth of an animal, comprising:
    a first endpiece having a first enlarged abutting surface designed to engage the mouth of an animal;
    a rod having first and second ends and an exposed length greater than its diameter, having first and second curvilinear threaded portions and first and second substantially flat surfaces adapted to be gripped by the mouth of an animal, said rod further having said first end coupled to the first endpiece; and
    a second endpiece having a second enlarged abutting surface and a threaded hole configured to rotatably thread onto the first and second curvilinear threaded portions of said rod, said second endpiece being further configured to move laterally along the first and second threaded portions of said rod when rotated about an axis formed along the length of said rod, wherein said rod extends through the second enlarged abutting surface and wherein a dimension of the mouth of an animal adjacent to said rod may be measured by rotating said second endpiece along said rod until the position of both said first and second endpieces is indicative of a dimension of the adjacent mouth.

2. The device of claim 1, further comprising a handle coupled to the first surface of said first endpiece, wherein said handle is configured to be gripped by a human.

3. The device of claim 2, wherein said handle, said first endpiece, and said second endpiece comprise a thermoplastic elastomer.

4. The device of claim 3, wherein said thermoplastic elastomer is Hytrel® thermoplastic polyester elastomer.

5. The device of claim 1, wherein the first enlarged abutting surface and second enlarged abutting surface are substantially circular.

6. The device of claim 1, wherein said rod comprises a thermoplastic elastomer.

7. The device of claim 6, wherein said thermoplastic elastomer is Hytrel® thermoplastic polyester elastomer.

8. The device of claim 1, wherein said rod comprises flavoring to facilitate retention of the device in an animal's mouth.

9. The device of claim 8, wherein the flavoring is an Apple flavoring.

10. The device of claim 1, wherein said rod further comprises multiple marks visible on the surface of said rod indicative of length.

11. The device of claim 10, wherein the marks indicative of length comprise at least one of English units and Metric units.

12. The device of claim 1, wherein said rod is between 7 and 12 inches long.

13. The device of claim 1, wherein said rod is round, and has a diameter of between ¼ and ¾ inches.

14. The device of claim 1, wherein said first and second endpieces are round, and have a diameter of between 1 and 5 inches.

15. A method for measuring a dimension of the mouth of an animal using a device having a threaded rod having a first endpiece attached to a first end of the rod and a second threaded endpiece threaded on the rod, comprising the steps of:
   forming at least one substantially flat surface on the threaded rod adapted to be held by the mouth of a horse;
   positioning the threaded rod adjacent to the mouth of an animal;
   rotating the second threaded endpiece about the length of the threaded rod such that it travels along the length of the threaded rod;
   stopping the rotation of the second threaded endpiece when the first and second endpieces are located adjacent boundaries of features of the animal's mouth to be measured; and
   determining the desired dimension by determining the distance between the first and second endpieces.

16. The method of claim 15, wherein the threaded rod includes visible marks indicative of length, and wherein the desired dimension is determined by observing the visible marks.

17. The method of claim 15, wherein the step of positioning the threaded rod adjacent to the mouth of an animal includes the step of placing the threaded rod in the mouth of the animal.

18. The method of claim 17, further including the step of removing the threaded rod from the mouth of the animal prior to determining the desired dimension.

19. The method of claim 15, wherein the device further comprises a handle attached to the first endpiece.

20. A device for measuring the mouth of an animal, comprising:
   a handle configured to be gripped by a human;
   a first endpiece having a first surface coupled to said handle, said first endpiece also having a second surface opposite said first surface, and having a diameter of between 1 and 5 inches;
   a rod having two curved, threaded portions that are separated by two flat portions and comprising a resiliently compressible polymer having first and second ends, an exposed length of between 7 and 12 inches, and a diameter of between ¼ and ¾ inches, said rod being threaded along at least part of its exposed length from said second end, said rod further having said first end coupled to the second surface of said first endpiece; and
   a second endpiece having a threaded hole configured to rotatably thread onto a threaded portion of said rod, said endpiece being further configured to move laterally along the length of a threaded area of said rod when rotated about an axis formed along the length of said rod, wherein a dimension of the mouth of an animal adjacent to said rod is measured by rotating said second endpiece along said rod until the position of both said first and second endpieces is adjacent the boundaries of a feature of the animal's mouth that is to be measured, and wherein the distance between said first and second endpieces is indicative of a desired dimension of the adjacent mouth.

\* \* \* \* \*